US012627078B2

(12) United States Patent
Yang et al.

(10) Patent No.: US 12,627,078 B2
(45) Date of Patent: May 12, 2026

(54) ANTENNA MODULE

(71) Applicant: LG INNOTEK CO., LTD., Seoul (KR)

(72) Inventors: Chan Woo Yang, Seoul (KR); Jeong Su Park, Seoul (KR); Jung Hun Oh, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 173 days.

(21) Appl. No.: 18/565,596

(22) PCT Filed: May 31, 2022

(86) PCT No.: PCT/KR2022/007729
§ 371 (c)(1),
(2) Date: Nov. 30, 2023

(87) PCT Pub. No.: WO2022/255773
PCT Pub. Date: Dec. 8, 2022

(65) Prior Publication Data

US 2024/0275073 A1 Aug. 15, 2024

(30) Foreign Application Priority Data

May 31, 2021 (KR) ........................ 10-2021-0069899

(51) Int. Cl.
*H01Q 21/28* (2006.01)
*H01Q 1/38* (2006.01)
(Continued)

(52) U.S. Cl.
CPC ............... *H01Q 21/28* (2013.01); *H01Q 1/38* (2013.01); *H01Q 9/0485* (2013.01); *H01Q 5/25* (2015.01)

(58) Field of Classification Search
CPC ........ H01Q 21/28; H01Q 1/38; H01Q 9/0485; H01Q 5/25; H01Q 1/521; H01Q 9/30; H01Q 1/48
See application file for complete search history.

(56) References Cited

U.S. PATENT DOCUMENTS 9,077,084 B2 7/2015 Li et al.
9,673,520 B2 * 6/2017 Zhang ...................... H01Q 9/42
(Continued)

FOREIGN PATENT DOCUMENTS

CN 111478036 A 7/2020
CN 112134010 A 12/2020
(Continued)

OTHER PUBLICATIONS

International Search Report dated Sep. 6, 2022 in International Application No. PCT/KR2022/007729.
(Continued)

*Primary Examiner* — Seung H Lee
(74) *Attorney, Agent, or Firm* — Saliwanchik, Lloyd & Eisenschenk

(57) ABSTRACT

An antenna module according to an embodiment of the present invention comprises: a substrate that includes a ground portion and a dielectric portion; a first antenna that has a length corresponding to a first frequency band and is located on one side of a first edge of the substrate; a second antenna that has a length corresponding to a second frequency band and is located on one side of a second edge of the substrate; and a stub that is located on the one side of the first edge or the one side of the second edge so as to be between the first antenna and the second antenna. The stub is spaced a first distance from the first antenna and spaced a second distance from the second antenna, wherein the first distance and the second distance are set on the basis of a first wavelength band and a second wavelength band which correspond to the first frequency band and the second frequency band.

8 Claims, 5 Drawing Sheets

(51) Int. Cl.
*H01Q 9/04* (2006.01)
*H01Q 5/25* (2015.01)

(56) References Cited

U.S. PATENT DOCUMENTS

| | | | | |
|---|---|---|---|---|
| 2007/0069960 | A1 | 3/2007 | Moon et al. | |
| 2013/0016024 | A1* | 1/2013 | Shi | H01Q 5/371 29/729 |
| 2014/0240903 | A1 | 8/2014 | DeLuis et al. | |
| 2016/0072195 | A1 | 3/2016 | Milankovic et al. | |

FOREIGN PATENT DOCUMENTS

| | | | |
|---|---|---|---|
| JP | 2013-197787 | A | 9/2013 |
| KR | 10-2009-0045764 | A | 5/2009 |
| KR | 10-2009-0095741 | A | 9/2009 |
| KR | 10-2010-0018371 | A | 2/2010 |
| KR | 10-1411444 | B1 | 7/2014 |
| WO | 2017/150054 | A1 | 9/2017 |

OTHER PUBLICATIONS

Office Action dated Nov. 19, 2024 in Japanese Application No. 2023-574176.
Supplementary European Search Report dated Apr. 17, 2025 in European Application No. 22816432.3.
Office Action dated Jul. 16, 2025 in Korean Application No. 10-2021-0069899.

* cited by examiner

ANTENNA MODULE

CROSS-REFERENCE TO RELATED APPLICATIONS

This application is the U.S. national stage application of International Patent Application No. PCT/KR2022/007729, filed May 31, 2022, which claims the benefit under 35 U.S.C. § 119 of Korean Application No. 10-2021-0069899, filed May 31, 2021, the disclosures of each of which are incorporated herein by reference in their entirety.

TECHNICAL FIELD

An embodiment relates to an antenna module.

BACKGROUND ART

Generally, studies have been conducted to improve the performance of an antenna device in a communication terminal. This is because the antenna device in the communication terminal is actually responsible for transmitting and receiving signals. Accordingly, a multiple-input multiple-output (MIMO) antenna device has been recently proposed as an antenna device mounted in a communication terminal. In this case, the MIMO antenna device includes a plurality of antenna elements. By transmitting and receiving signals in a predetermined frequency band through the antenna elements in such a MIMO antenna device, it is possible to access various communication networks.

However, when the above-described MIMO antenna device operates, there is a problem in that electromagnetic coupling between the antenna elements occurs, resulting in deterioration of the performance of the communication terminal.

In order to reduce mutual interference between antennas, a method such as adjusting a separation distance between antenna elements, inserting a decoupling circuit, designing a suspended line, or the like is also used.

However, in the case of separation distance adjustment, a problem arises in that antenna design miniaturization becomes difficult. In the cases of decoupling circuit insertion and suspended line design, a problem arises in that only narrow-band frequencies are available, and thus it is difficult to apply the cases to a multi-band and a broad-band (for example, ultra-wideband (UWB)) system.

Accordingly, a method of suppressing electromagnetic mutual coupling between antenna elements in the MIMO antenna device is required.

DISCLOSURE

Technical Problem

An embodiment is directed to providing an antenna module capable of improving the degree of isolation between a plurality of antennas included in the antenna module.

The problems to be solved by the embodiment are not limited thereto, and purposes or effects which may be grasped from solutions or embodiments of the problems to be described below are also included.

Technical Solution

An antenna module according to an embodiment of the present invention includes: a substrate including a ground portion and a dielectric portion; a first antenna formed to have a length corresponding to a first frequency band, and disposed on one side of a first edge of the substrate; a second antenna formed to have a length corresponding to a second frequency band, and disposed on one side of a second edge of the substrate; and a stub disposed on the one side of the first edge or the one side of the second edge between the first antenna and the second antenna, wherein the stub is disposed to be spaced apart from the first antenna by a first distance and is disposed to be spaced apart from the second antenna by a second distance, and the first distance and the second distance are set on the basis of a first wavelength band and a second wavelength band corresponding to the first frequency band and the second frequency band.

The first antenna and the second antenna may be disposed on the dielectric portion.

The stub may be disposed on the dielectric portion, and connected to the ground portion.

The first frequency band and the second frequency band may be the same frequency band.

The first distance may be a distance from a first point, which is a center of a region where the first antenna and an edge of the ground portion intersect, to a second point, which is a center of a region where the stub and the ground portion intersect.

The second distance may be a distance from a third point, which is a center of a region where the second antenna and an edge of the ground portion intersect, to a second point, which is a center of a region where the stub and the ground portion intersect.

The first distance may be ⅛ to 1 times the first wavelength band.

The first distance may be ⅛ to ⅞ times the first wavelength band.

The first distance may be ¼ to ¾ times the first wavelength band.

The first distance may be ½ times the first wavelength band.

An antenna module according to an embodiment of the present invention includes: a substrate including a ground portion and a dielectric portion; a first antenna formed to have a length corresponding to a first frequency band, and disposed on one side of a first edge of the substrate; a second antenna formed to have a length corresponding to a second frequency band, and disposed on one side of a second edge of the substrate; and a stub disposed on the one side of the first edge or the one side of the second edge between the first antenna and the second antenna, wherein the stub is disposed to be spaced apart from the first antenna by a first distance and is disposed to be spaced apart from the second antenna by a second distance, and the first distance is set on the basis of an electric field of the first antenna.

The stub may be disposed at a null point of the electric field of the first antenna.

Advantageous Effects

According to an embodiment, the degree of isolation between a plurality of antennas installed on one substrate can be improved.

Further, the performance of a plurality of antennas installed on one substrate can be improved.

In addition, an antenna module can be miniaturized.

Various useful advantages and effects of the present invention are not limited to the above-described contents, and can be more easily understood in a process of describing specific embodiments of the present invention.

MODES OF THE INVENTION

Hereinafter, preferable embodiments of the present invention will be described in detail with reference to the accompanying drawings.

However, the technical spirit of the present invention is not limited to some embodiments which will be described and may be embodied in various forms, and one or more elements in the embodiments may be selectively combined and replaced to be used within the scope of the technical spirit of the present invention.

Further, terms used in the embodiments of the present invention (including technical and scientific terms) may be interpreted with meanings that are generally understood by those skilled in the art unless particularly defined and described, and generally used terms, such as terms defined in a dictionary, may be understood in consideration of their contextual meanings in the related art.

In addition, terms used in the description are provided not to limit the present invention but to describe the embodiments.

In the specification, the singular form may also include the plural form unless the context clearly indicates otherwise and may include one or more of all possible combinations of A, B, and C when disclosed as at least one (or one or more) of "A, B, and C."

Further, terms such as first, second, A, B, (a), (b), and the like may be used to describe elements of the embodiments of the present invention.

The terms are only provided to distinguish an element from other elements, and the nature, sequence, order, or the like of the elements are not limited by the terms.

Further, when a particular element is disclosed as being "connected," "coupled," or "linked" to another element, this may not only include a case of the element being directly connected, coupled, or linked to the other element but also a case of the element being connected, coupled, or linked to the other element by another element between the element and the other element.

In addition, when one element is disclosed as being formed "on or under" another element, the term "on or under" includes both a case in which the two elements are in direct contact with each other and a case in which at least another element is disposed between the two elements (indirect contact). Further, when the term "on or under" is expressed, a meaning of not only an upward direction but also a downward direction may be included based on one element.

Figure 1:
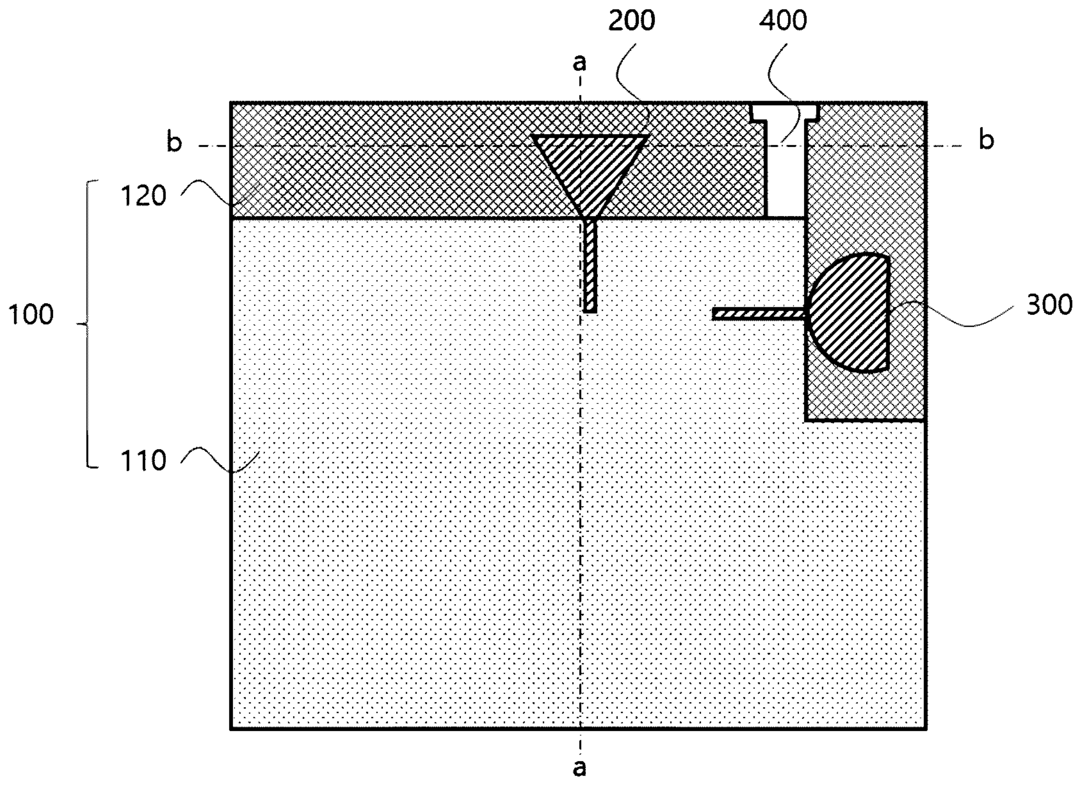
FIG. 1 is a view schematically illustrating an antenna module according to an embodiment of the present invention.
Figure 2:
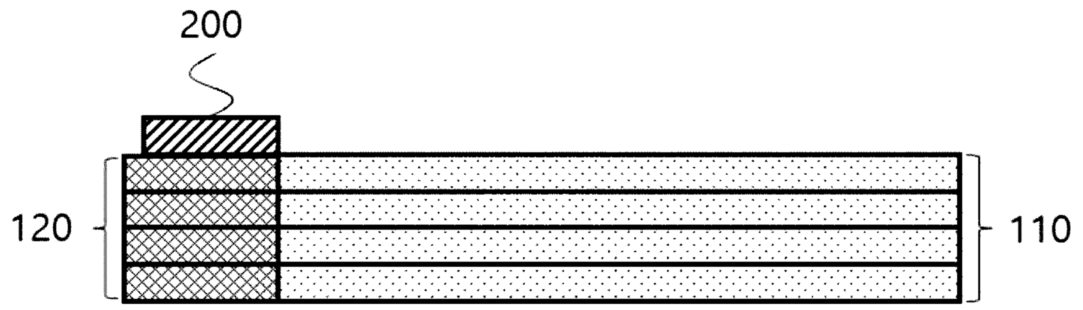
FIG. 2 is a view illustrating a cross-section a-a in FIG. 1.
Figure 3:
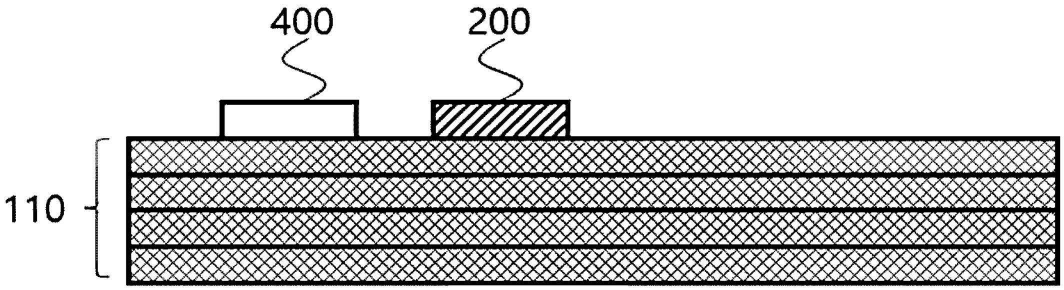
FIG. 3 is a view illustrating a cross-section b-b in FIG. 1.

FIG. 1 is a view schematically illustrating an antenna module according to an embodiment of the present invention. FIG. 2 is a view illustrating a cross-section a-a in FIG. 1. FIG. 3 is a view illustrating a cross-section b-b in FIG. 1.

Referring to FIG. 1, the antenna module according to the embodiment of the present invention may include a substrate 100, a first antenna 200, a second antenna 300, and a stub 400. The substrate 100 may include a ground portion 110 and a dielectric portion 120.

The ground portion 110 may be composed of a conductor. The ground portion 110 may be formed of at least one ground layer. For example, the ground portion 110 may be formed of one to four ground layers, but is not limited thereto. The ground portion 110 may be formed of four or more ground layers. When the ground portion 110 is formed of a plurality of ground layers, the ground portion 110 may be implemented in a structure in which the plurality of ground layers are stacked. When the plurality of ground layers are stacked, the ground portion 110 may include at least one via hole passing through the plurality of ground layers. A circuit element and the like for antenna transmission and reception may be disposed on an upper surface of the ground portion 110.

The dielectric portion 120 may be composed of a dielectric material. For example, the dielectric portion 120 may be composed of a flame retardant 4 (FR4) epoxy dielectric material. The dielectric portion 120 may be formed of at least one dielectric layer. For example, the dielectric portion 120 may be formed of one to four dielectric layers, but is not limited thereto. The dielectric portion 120 may be formed of four or more dielectric layers. When the dielectric portion 120 is formed of a plurality of dielectric layers, the dielectric portion 120 may be implemented in a structure in which the plurality of dielectric layers are stacked.

The ground portion 110 and the dielectric portion 120 may be disposed on the side of each other. For example, as shown in FIGS. 1 to 3, an inner surface of a '7'-shaped dielectric portion 120 and an outer surface of an 'L'-shaped ground portion 110 may be disposed in a form of coming into contact with each other.

The first antenna 200 may operate in a first frequency band. That is, the first antenna 200 may transmit and receive signals in the first frequency band. According to one embodiment, the first frequency band may be a frequency band for ultra wideband (UWB) communication. For example, the first frequency band may be a frequency band of 3.1 to 10.6 GHz. According to another embodiment, the first frequency band may be a frequency band for Bluetooth communication and/or a frequency band for Wi-Fi communication. For example, the first frequency band may be the 2.4 GHz frequency band.

The first antenna 200 may be formed to have a length corresponding to the first frequency band. The length of the first antenna 200 may be calculated on the basis of the following Equation 1.

$$\lambda_1 = c/f_1 \quad \text{[Equation 1]}$$

Here, $f_1$ refers to a frequency included in the first frequency band, c refers to the speed of light, and Mu refers to a wavelength included in a wavelength region corresponding to the first frequency band.

The length of the first antenna 200 may be set according to the wavelength. According to one embodiment, the length of the first antenna 200 may be 0.25 times the wavelength (that is, the length of the first antenna 200 is $\lambda_1/4$). As another example, the length of the first antenna 200 may be the same as the wavelength (that is, the length of the first antenna 200 is $\lambda_1$). As still another example, the length of the first antenna 200 may be 0.5 times the wavelength (that is, the length of the first antenna 200 is $\lambda_1/2$).

The first antenna 200 may be disposed on an edge of the substrate 100. The first antenna 200 may be disposed on one side of a first edge of the substrate 100. The first antenna 200 may be disposed on the dielectric layer disposed on the one side of the first edge of the substrate 100.

The second antenna 300 may operate in a second frequency band. That is, the second antenna 300 may transmit and receive signals in the second frequency band. According to one embodiment, the second frequency band may be a frequency band for UWB communication. For example, the second frequency band may be a frequency band of 3.1 to 10.6 GHz. According to another embodiment, the second frequency band may be a frequency band for Bluetooth communication and/or a frequency band for Wi-Fi communication. For example, the second frequency band may be the 2.4 GHz frequency band.

The second antenna 300 may be formed to have a length corresponding to the second frequency band. The length of the second antenna 300 may be calculated on the basis of the following Equation 2.

$$\lambda_2 = c/f_2 \quad \text{[Equation 2]}$$

Here, $f_2$ refers to a frequency included in the second frequency band, c refers to the speed of light, and $\lambda_2$ refers to a wavelength included in a wavelength region corresponding to the second frequency band.

The length of the second antenna 300 may be set according to the wavelength. According to one embodiment, the length of the second antenna 300 may be 0.25 times the wavelength (that is, the length of the second antenna 300 is $\lambda_2/4$). As another example, the length of the second antenna 300 may be the same as the wavelength (that is, the length of the second antenna 300 is $\lambda_2$). As still another example, the length of the second antenna 300 may be 0.5 times the wavelength (that is, the length of the second antenna 300 is $\lambda_2/2$).

The second antenna 300 may be disposed on an edge of the substrate 100. The second antenna 300 may be disposed on one side of a second edge of the substrate 100. The second antenna 300 may be disposed on the dielectric layer 120 disposed on the one side of the second edge of the substrate 100.

The first frequency band in which the first antenna 200 operates and the second frequency band in which the second antenna 300 operates may be the same frequency band. According to one embodiment, the first antenna 200 and the second antenna 300 may be antennas which perform UWB communication. Accordingly, the first frequency band and the second frequency band may be frequency bands for UWB communication. According to another embodiment, the first antenna 200 and the second antenna 300 may be antennas which perform Bluetooth communication. Accordingly, the first frequency band and the second frequency band may be frequency bands for Bluetooth communication. According to still another embodiment, the first antenna 200 and the second antenna 300 may be antennas which perform Wi-Fi communication. Accordingly, the first frequency band and the second frequency band may be frequency bands for Wi-Fi communication. According to yet another embodiment, the first antenna 200 may be an antenna which performs Bluetooth communication and the second antenna 300 may be an antenna which performs Wi-Fi communication. Each of the first frequency band and the second frequency band may be the 2.4 GHz frequency band. According to yet another embodiment, the first antenna 200 may be an antenna which performs Wi-Fi communication and the second antenna 300 may be an antenna which performs Bluetooth communication. Each of the first frequency band and the second frequency band may be the 2.4 GHz frequency band.

The stub 400 may operate to remove interference due to mutual coupling between the first antenna 200 and the second antenna 300.

A shape and a length of the stub 400 may be designed on the basis of the first frequency band and the second frequency band of the first antenna 200 and the second antenna 300, the permittivity of the dielectric portion 120, and the like.

The stub 400 may be disposed between the first antenna 200 and the second antenna 300. The stub 400 may be disposed on one side of the first edge or one side of the second edge. The stub 400 may be disposed on the one side of the first edge between the first antenna 200 and the second antenna 30. The stub 400 may be disposed on the one side of the second edge between the first antenna 200 and the second antenna 300.

The stub 400 may be disposed on the dielectric portion 120. That is, the stub 400 may be disposed on the dielectric portion 120 like the first antenna 200 and the second antenna 300. The stub 400 may be disposed on the dielectric portion 120 disposed on the one side of the first edge between the first antenna 200 and the second antenna 300. The stub 400 may be disposed on the dielectric portion 120 disposed on the one side of the second edge between the first antenna 200 and the second antenna 300.

The stub 400 may be disposed to be spaced apart from the first antenna 200 by a first distance. The first distance may be set on the basis of a first wavelength band corresponding to the first frequency band. The first distance may be set on the basis of a radiation pattern of the first antenna 200. The stub 400 may be disposed at a null point of the radiation pattern of the first antenna 200.

The stub 400 may be disposed to be spaced apart from the second antenna 300 by a second distance. The second distance may be set on the basis of a second wavelength band corresponding to the second frequency band. The second distance may be set on the basis of a radiation pattern of the second antenna 300. The stub 400 may be disposed at a null point of the radiation pattern of the second antenna 300.

As seen above, since the first frequency band and the second frequency band may be the same frequency band, the first distance and the second distance may be set on the basis of the same wavelength band. Further, since the first antenna 200 and the second antenna 300 may operate in the same frequency band, the first distance and the second distance may be set on the basis of the same radiation pattern.

Descriptions for the first distance and the second distance will be described in detail below through the drawings.

Figure 4:
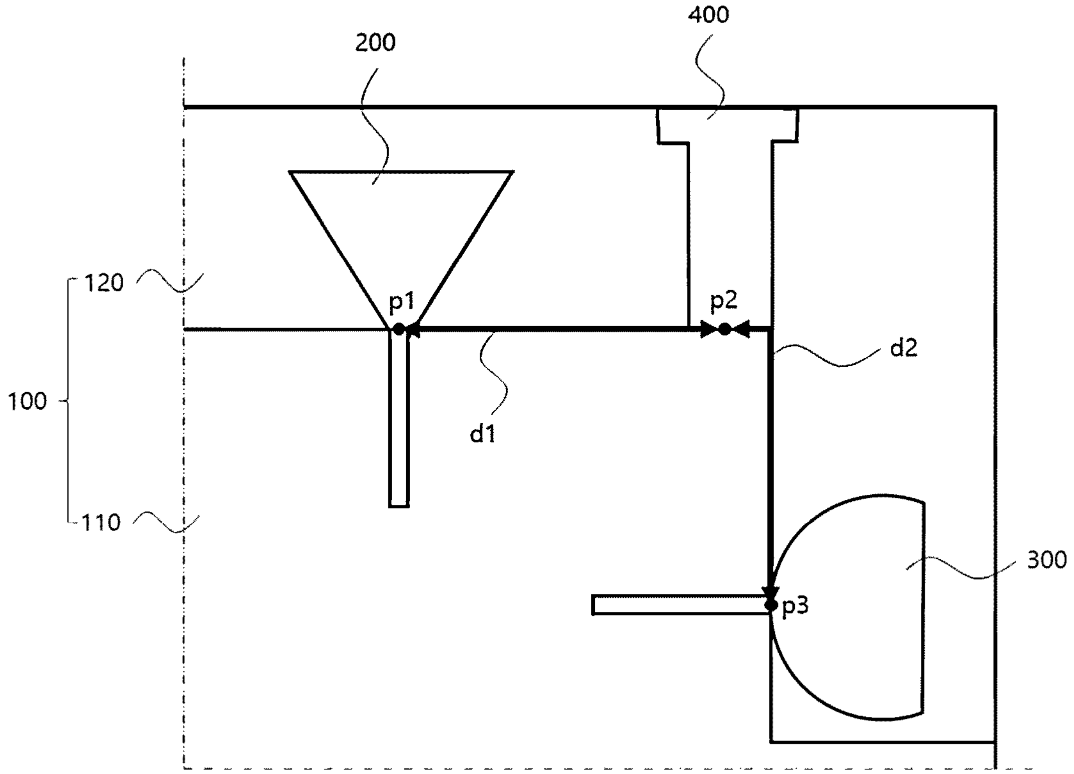
FIG. 4 is a view for describing a first distance and a second distance according to the embodiment of the present invention.

FIG. 4 is a view for describing a first distance and a second distance according to the embodiment of the present invention.

A first distance d1 may be a distance between a first point p1 of the first antenna 200 and a second point p2 of the stub 400. The first point p1 may refer to the center of a region where an edge of the ground portion 110 and the first antenna 200 intersect. The second point p2 may refer to the center of a region where the edge of the ground portion 110 and the stub 400 intersect. The first distance d1 may refer to a distance between the first point p1 and the second point p2 along the edge of the ground portion 110.

A second distance d2 may be a distance between a third point p3 of the second antenna 300 and the second point p2 of the stub 400. The third point p3 may refer to the center of a region where an edge of the ground portion 110 and the second antenna 300 intersect. The second point p2 may refer to the center of a region where the edge of the ground portion 110 and the stub 400 intersect. The second distance d2 may refer to a distance between the third point p3 and the second point p2 along the edge of the ground portion 110.

According to a first embodiment of the present invention, the first distance d1 may be ⅛ to 1 times the first wavelength band. The first distance d1 may be ⅛ to 1 times a wavelength included in the first wavelength band. Further, the second distance d2 may be ⅛ to 1 times the second wavelength band. The second distance d2 may be ⅛ to 1 times a wavelength included in the second wavelength band. Since the first frequency band and the second frequency band may be the same frequency band, the first distance d1 and the second distance d2 may be set to ⅛ to 1 times the same wavelength band. Since the first frequency band and the second frequency band may be the same frequency band, the first distance d1 and the second distance d2 may be set to ⅛ to 1 times the same wavelength.

According to the first embodiment of the present invention, the first distance d1 may be ⅛ to ⅞ times the first wavelength band. The first distance d1 may be ⅛ to ⅞ times a wavelength included in the first wavelength band. Further, the second distance d2 may be ⅛ to ⅞ times the second wavelength band. The second distance d2 may be ⅛ to ⅞ times a wavelength included in the second wavelength band. Since the first frequency band and the second frequency band may be the same frequency band, the first distance d1 and the second distance d2 may be set to ⅛ to ⅞ times the same wavelength band. Since the first frequency band and the second frequency band may be the same frequency band, the first distance d1 and the second distance d2 may be set to ⅛ to ⅞ times the same wavelength. For example, the first distance d1 may be set to ⅛ times the wavelength and the second distance d2 may be set to ⅞ times the wavelength.

According to the first embodiment of the present invention, the first distance d1 may be ¼ to ¾ times the first wavelength band. The first distance d1 may be ¼ to ¾ times a wavelength included in the first wavelength band. Further, the second distance d2 may be ¼ to ¾ times the second wavelength band. The second distance d2 may be ¼ to ¾ times a wavelength included in the second wavelength band. Since the first frequency band and the second frequency band may be the same frequency band, the first distance d1 and the second distance d2 may be set to ¼ to ¾ times the same wavelength band. Since the first frequency band and the second frequency band may be the same frequency band, the first distance d1 and the second distance d2 may be set to ¼ to ¾ times the same wavelength. For example, the first distance d1 may be set to ¼ times the wavelength and the second distance d2 may be set to ¾ times the wavelength.

According to the first embodiment of the present invention, the first distance d1 may be ½ times the first wavelength band. The first distance d1 may be ½ times a wavelength included in the first wavelength band. Further, the second distance d2 may be ½ times the second wavelength band. The second distance d2 may be ½ times a wavelength included in the second wavelength band. Since the first frequency band and the second frequency band may be the same frequency band, the first distance d1 and the second distance d2 may be set to ½ times the same wavelength band. Since the first frequency band and the second frequency band may be the same frequency band, the first distance d1 and the second distance d2 may be set to ½ times the same wavelength. For example, the first distance d1 may be set to ½ times the wavelength and the second distance d2 may be set to ½ times the wavelength. In this case, the first distance d1 and the second distance d2 may be the same.

As shown in the embodiment of the present invention, when the stub 400 is disposed in the antenna module, the influence of current due to direct coupling between the first antenna 200 and the second antenna 300 may be greatly reduced. That is, since the current generated from each antenna is concentrated at the stub 400, interference between the antennas may be reduced.

Specifically, when the first distance d1 and the second distance d2 are set as described above, since the stub 400 may be disposed in a region where the influence of an electric field of each antenna is low or a null region where there is almost no influence, the current concentration to the stub 400 may greatly increase to increase the degree of isolation between the two antennas. Accordingly, the antenna module may be miniaturized.

Figure 5A:
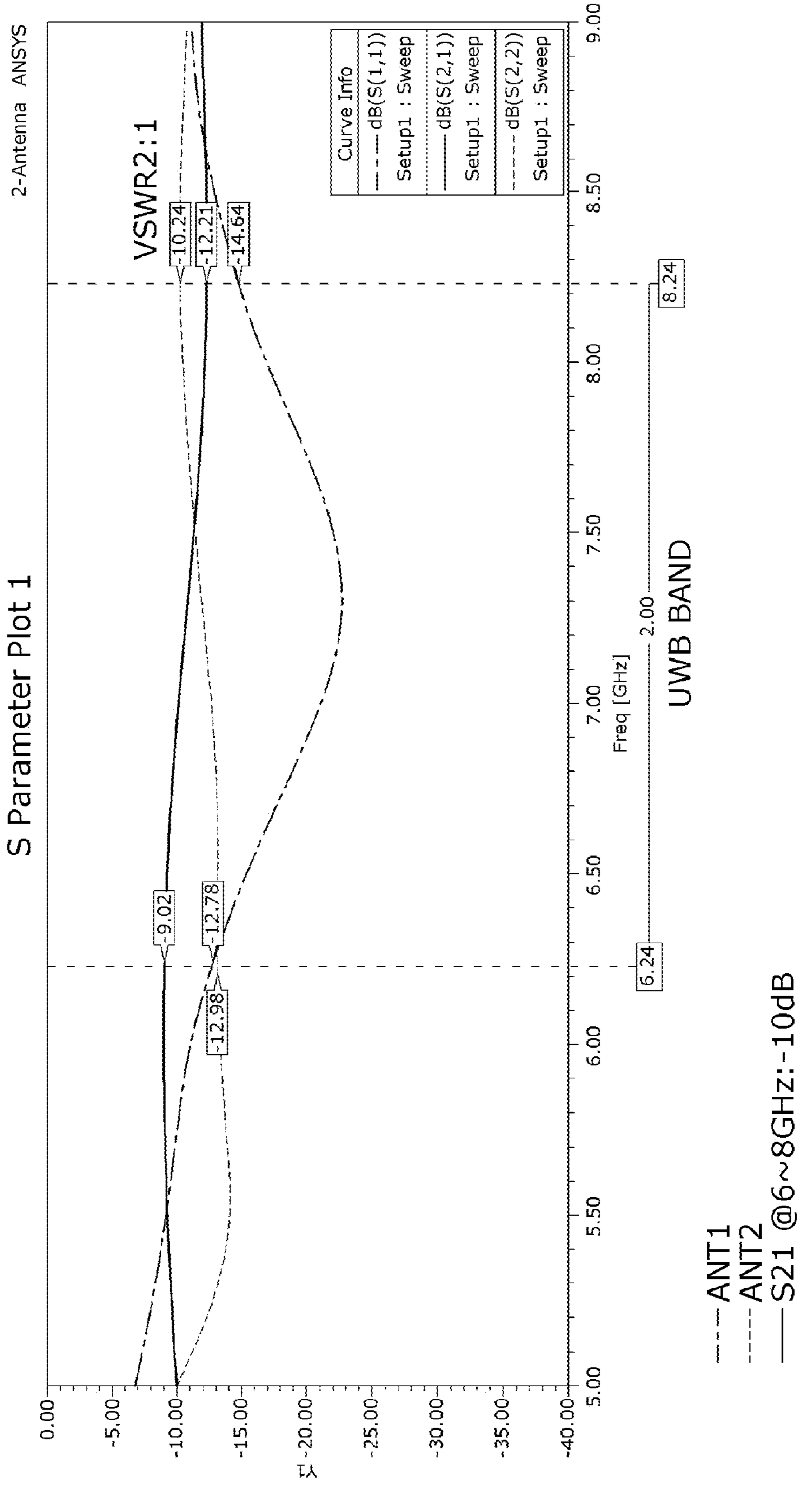
FIGS. 5A and 5B are views for describing an S parameter simulation result according to the embodiment of the present invention.
Figure 5B:
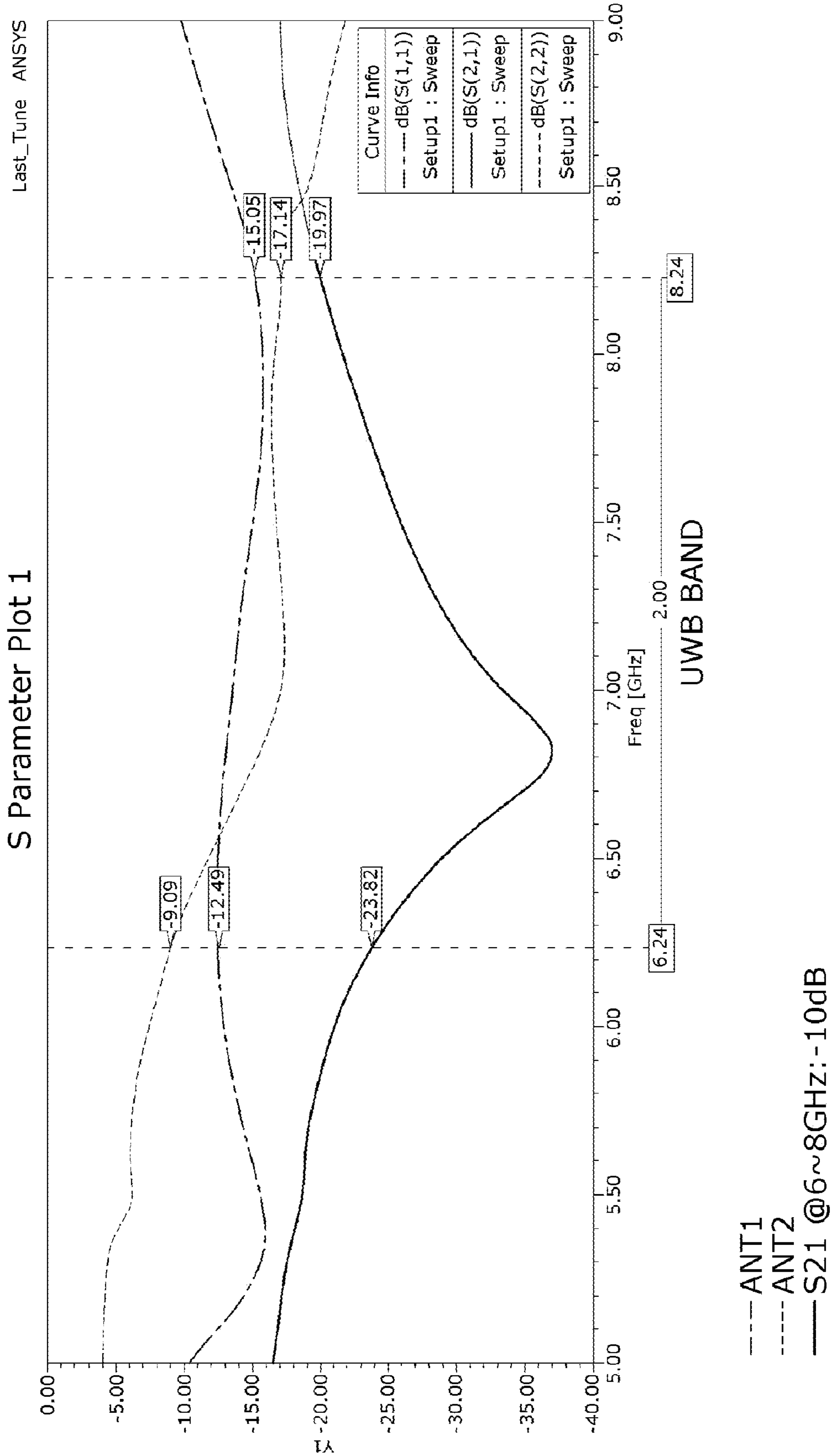
Figure 6:
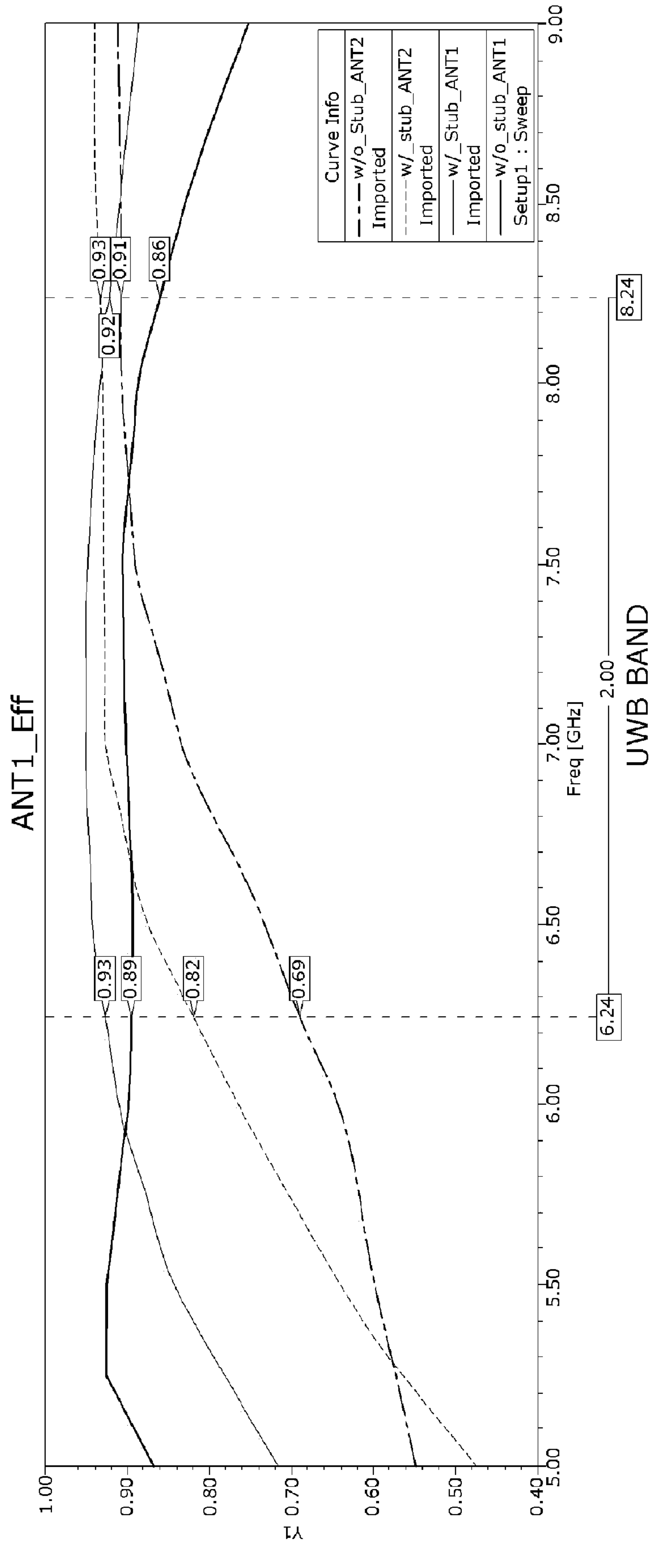
FIG. 6 is a view for describing antenna performance according to the embodiment of the present invention.

FIGS. 5A and 5B are views for describing an S parameter simulation result according to the embodiment of the present invention. FIG. 6 is a view for describing antenna performance according to the embodiment of the present invention.

In FIGS. 5A, 5B, and 6, it was assumed that the UWB communication frequency band is 6.24 to 8.24 GHZ, and an impedance bandwidth was simulated on the basis of VSWR 2:1. FIG. 5A is a simulation result of a conventional antenna module, and FIG. 5B is a simulation result of the antenna module according to the embodiment of the present invention.

Referring to FIG. 5A, in the conventional antenna module, it can be seen that an isolation characteristic between the first antenna and the second antenna is low when the two antennas operate in the UWB band. Due to deterioration of the isolation characteristic, it can be seen that the antennas do not provide normal performance in the frequency band of 6.24 to 8.24 GHZ, and electromagnetic interference of each antenna is severe.

On the other hand, referring to FIG. 5B, in the antenna module according to the embodiment of the present invention, it can be seen that the isolation characteristic between the first antenna and the second antenna is excellent when the two antennas operate in the UWB band. Since the stub disposed spaced apart by predetermined distances (first distance and second distance) between the first antenna and the second antenna operates as a low pass filter (LPF), an improvement in degree of isolation (S21) of approximately 20 dB occurred compared to the conventional antenna module (the degree of isolation in the conventional antenna module is approximately −10 dB, and the degree of isolation in the antenna module of the present invention is approximately −30 dB).

Referring to FIG. 6, it can be seen that performance of the first antenna and the second antenna is improved when the stub according to the embodiment of the present invention is present. When the stub is present, it can be seen that the performance of the first antenna and the second antenna of the antenna module according to the embodiment of the present invention is improved by 4 to 13% on average compared to the performance of the first antenna and the second antenna of the conventional antenna module. Further, it can be seen that the peak value of the conventional antenna module is approximately 3 dBi whereas the peak value of the antenna module according to the embodiment of the present invention is approximately 4 dBi, and thus there was a performance improvement of approximately 1 dB.

Although the embodiment has been mainly described above, this is only an example and does not limit the present invention, and those skilled in the art will know that various modifications and applications, which are not exemplified above, are possible without departing from essential characteristics of the embodiment. For example, each component specifically shown in the embodiment may be modified and implemented. Further, it should be interpreted that differences related to these modifications and applications are included in the scope of the present invention defined in the appended claims.

The invention claimed is:

1. An antenna module comprising:

a substrate including a ground portion and a dielectric portion;

a first antenna formed to have a length corresponding to a first frequency band, and disposed on one side of a first edge of the substrate;

a second antenna formed to have a length corresponding to a second frequency band, and disposed on one side of a second edge of the substrate; and a stub disposed on the one side of the first edge or the one side of the second edge between the first antenna and the second antenna, wherein the stub is disposed to be spaced apart from the first antenna by a first distance and is disposed to be spaced apart from the second antenna by a second distance, wherein the first distance and the second distance are respectively set on a basis of a first wavelength band and a second wavelength band corresponding to the first frequency band and the second frequency band, respectively, wherein the stub is disposed on the dielectric portion and connected to the ground portion, and wherein the first distance is configured to be ½ times a wavelength within the first wavelength band.

2. The antenna module of claim 1, wherein the first antenna and the second antenna are disposed on the dielectric portion.

3. The antenna module of claim 1, wherein the first frequency band and the second frequency band are identical.

4. The antenna module of claim 1, wherein the first distance is a distance from a first point, which is a center of a region where the first antenna and an edge of the ground portion intersect, to a second point, which is a center of a region where the stub and the ground portion intersect.

5. The antenna module of claim 1, wherein the second distance is a distance from a third point, which is a center of a region where the second antenna and an edge of the ground portion intersect, to a second point, which is a center of a region where the stub and the ground portion intersect.

6. The antenna module of claim 1, wherein the first distance is configured to be ⅛ to 1 times a wavelength within the first wavelength band.

7. The antenna module of claim 1, wherein the first distance is configured to be ⅛ to ⅞ times a wavelength within the first wavelength band.

8. The antenna module of claim 1, wherein the first distance is configured to be ¼ to ¾ times a wavelength within the first wavelength band.

* * * * *